United States Patent
Dorenbosch et al.

(10) Patent No.: US 6,850,503 B2
(45) Date of Patent: Feb. 1, 2005

(54) METHOD AND APPARATUS FOR EFFECTING A HANDOFF BETWEEN TWO IP CONNECTIONS FOR TIME CRITICAL COMMUNICATIONS

(75) Inventors: Jheroen P. Dorenbosch, Paradise, TX (US); David L. Raymer, Watauga, TX (US)

(73) Assignee: Motorola, Inc., Schaumburg, IL (US)

( * ) Notice: Subject to any disclaimer, the term of this patent is extended or adjusted under 35 U.S.C. 154(b) by 106 days.

(21) Appl. No.: 10/212,922

(22) Filed: Aug. 6, 2002

(65) Prior Publication Data

US 2004/0030791 A1 Feb. 12, 2004

(51) Int. Cl.$^7$ .......... H04L 12/66; H04L 12/28; G01R 31/08; H04Q 7/20
(52) U.S. Cl. .......... 370/331; 370/389; 370/352; 370/228; 455/436
(58) Field of Search .......... 370/352, 331, 370/228, 225, 384, 389, 400, 351, 338, 401, 332, 341, 468, 329; 455/436, 445, 432, 437, 557, 466, 426, 442, 433, 439, 525

(56) References Cited

U.S. PATENT DOCUMENTS

| | | | | |
|---|---|---|---|---|
| 5,974,036 A | * | 10/1999 | Acharya et al. | 370/331 |
| 6,243,581 B1 | * | 6/2001 | Jawanda | 455/432 |
| 6,434,134 B1 | * | 8/2002 | La Porta et al. | 370/338 |
| 6,628,632 B1 | * | 9/2003 | Dolan | 370/332 |
| 2003/0120716 A1 | * | 6/2003 | McClellan et al. | 370/338 |

* cited by examiner

Primary Examiner—Hanh Nguyen

(57) ABSTRACT

A method 900 of and wireless communications unit 800 for effecting a handoff from a first Internet Protocol (IP) connection 221 to a second IP connection 331 for a time critical communication is disclosed. The method includes communicating 905 between a first wireless station 219 and a second station 331 using the first IP connection and a first IP address 223 for the first wireless station; setting up 907 the second IP connection with a second IP address for the first wireless station, the first IP connection being a primary connection and the second IP connection being a secondary connection, both existing concurrently; determining 915 that the second IP connection should be the primary connection; and changing 917 the second IP connection to the primary connection by informing the second station that the second IP address is the primary address using stream control transmission protocol (SCTP) messages, wherein the time critical communication is immediately switched over to the second IP connection.

42 Claims, 8 Drawing Sheets

METHOD AND APPARATUS FOR EFFECTING A HANDOFF BETWEEN TWO IP CONNECTIONS FOR TIME CRITICAL COMMUNICATIONS

FIELD OF THE INVENTION

This invention relates in general to communication systems, and more specifically to a method and apparatus for effecting a handoff of time critical communications from one IP connection to another.

BACKGROUND OF THE INVENTION

Communications systems are known and continue to evolve rapidly as is quite evident in wireless communications systems. Systems have and are being deployed that allow packet data enabled mobile stations access to packet data networks such as the Internet or internet like networks that utilize IP addresses and various packet data transport protocols such as internet protocol (IP), transport control protocol (TCP), universal datagram protocol (UDP) and more recently stream control transmission protocol (SCTP). Many second+ and third generation cellular and cellular like systems, such as GPRS (general packet radio service), CDMA (code division multiple access) 2000, Wideband CDMA, UMTS (Universal mobile telecommunications service) rely on or support such packet data protocols. Such cellular systems are typically arranged and constructed to provide handoff for a communications from one cellular fixed point to another more or less transparent to or with little or no indication to a user of the system.

Other communications systems are gaining popularity and these may be characterized as wireless small or local area systems that provide services to users, typically after proper authorization and authentication procedures have been successful. Such wireless systems include ones based on or designed around IEEE 802.11. Most of these systems are designed to be low cost and largely intended to eliminate hooking up wires and cables. Thus these systems for the most part have not dealt with mobility issues, such as handing off a communications from one fixed or access point to another in the midst of a communications much less accepting or initiating handoffs from and to cellular or cellular like systems. Some 802.11 systems do have the ability to pick up a communication that has been dropped by one fixed point at another fixed point provided the fixed points are part of the same subnet, referred to as a basic services set or BSS in 802.11 systems however this can take several seconds and is not suitable for handling mobile users with real-time or time critical needs.

Clearly a need exists for methods and apparatus for effecting a handoff of time critical communications from one IP connection to another. Preferably this will be transparent to the systems, network operators, and users and employ SCTP techniques.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

Figure 1:
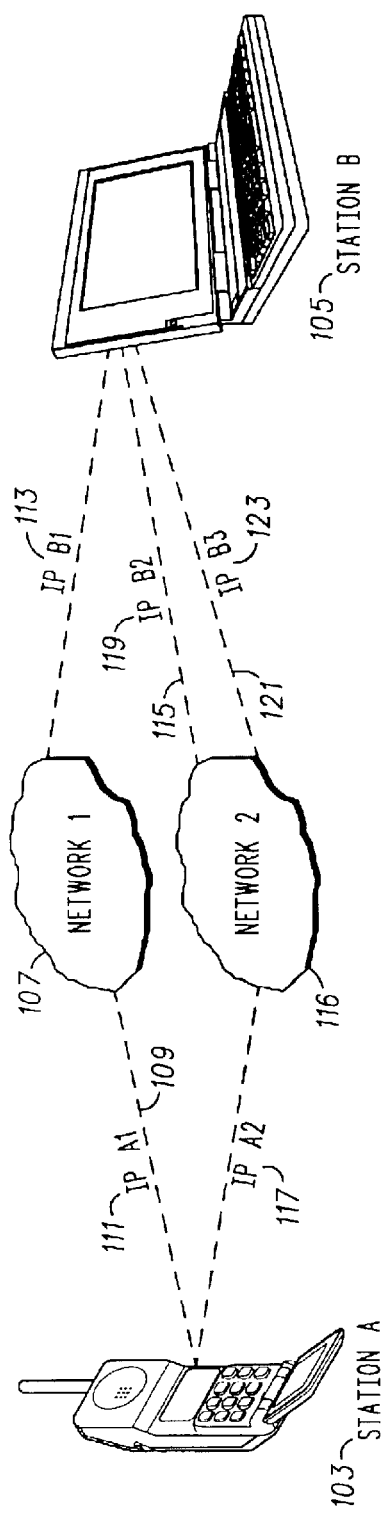
FIG. 1 depicts, in a simplified and exemplary form, a system level diagram of a communications system utilizing stream control transmission protocol to support multiple connections between stations.

In overview form the present disclosure concerns communications systems that provide service to wireless communications units or more specifically users thereof operating therein. More particularly various inventive concepts and principles embodied in methods and apparatus for effecting a handoff of time critical communications from one IP connection to another using SCTP messages are disclosed and discussed. The communications systems of particular interest are at least partly wireless and are those being developed and deployed such as 802.11 local area systems and such local area systems together with second plus and third generation cellular and cellular like systems, such as GPRS (general packet radio service), CDMA (code division multiple access) 2000, Wideband CDMA, UMTS (Universal mobile telecommunications service) that need to address mobility concerns within the local areas systems and between the local area and other systems, such as cellular systems.

As further discussed below various inventive principles and combinations thereof are advantageously employed to induce the end points or stations that are communicating to set up alternative IP connections that may be used as required to effect a handoff when needed or desired without further intervention by any of the system components or equipment in a fashion that is transparent to the user and user communications, thus alleviating various problems associated with known systems provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, IP any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, IP any, will be limited to the essentials with respect to the principles and concepts within the preferred embodiments.

Referring to FIG. 1, a simplified and exemplary system level diagram of a communications system utilizing stream control transmission protocol to support multiple IP connections between stations, specifically station A 103 and station B 105, will be discussed and described. In FIG. 1 Station A 103, depicted as a mobile wireless communications unit, such as a cellular or subscriber handset or messaging unit or the like is in communication with station B 105, shown as a portable laptop computer, via a first network 107 and first IP connection 109 with station A having a first IP address, IP A1 111 and station B having a first IP address, IP B1 113. Station A and station B are also sharing a second IP connection 115 via a second network 116 with station A having a second IP address, IP A2 117 and station B a second IP address, IP B2 119. A third IP connection 121 is shown with station A using its second IP address, IP A2 117 and station B using a third IP address, IP B3 123.

The above multiple connection arrangement is made possible using a relatively new transmission protocol, known as Stream Control Transmission Protocol (SCTP) that was recently standardized by the Internet Engineering Task Force (IETF). It operates at the same layer as TCP and UDP and can be viewed as a more capable version of TCP. SCTP was designed to provide a way for an application on an endpoint or station to manage concurrent reliable streams with another station such that the streams will not block each other. SCTP can also mix reliable streams with best effort streams. SCTP is also expected to increase availability by allowing a station to specify to another endpoint or station that it has more than one IP destination address. The other endpoint will pick one of the addresses as the primary destination address. When that address fails, the SCTP layer will automatically switch to an alternative destination address. The switching does not need any help from the application that uses the SCTP layer. Especially when the alternative addresses use different networks, system reliability goes up tremendously. However, an SCTP fail-over switching can take several seconds and this is too slow for time critical communications such as voice or video. This disclosure discusses and discloses various concepts and principles that will address this concern.

SCTP does not allow an endpoint such as station A or B to change the addresses it has supplied to the other endpoint without first suspending and reinitializing the IP connection. It can also not specify which of the addresses should be used by the other endpoint as the primary destination address. SCTP is being extended to allow operators to change IP equipment within a station or endpoint without having to re-initialize the SCTP transport (see draft-ietf-tsvwg-addip-sctp-03.txt). The IETF draft defines SCTP extension messages that an endpoint can use to inform the other endpoint that; a destination address is to be deleted, a destination address is to be added, or a specified address is to be used as the primary destination address. These SCTP extension messages can be used in a novel and advantageous manner to support and effect a timely handoff between IP connections. Co-pending patent application by Dorenbosch et al., titled METHOD AND APPARATUS FOR EFFECTING A SEAMLESS HANDOFF BETWEEN IP CONNECTIONS, having a like filing date and assigned to the same assignee as here discusses a novel and inventive technique for effecting handoffs with a station using TCP/UDP that employs a gateway. Here we discuss and describe various aspects of a novel and inventive technique to effect the handoff between stations using SCTP schemes.

Figure 2:
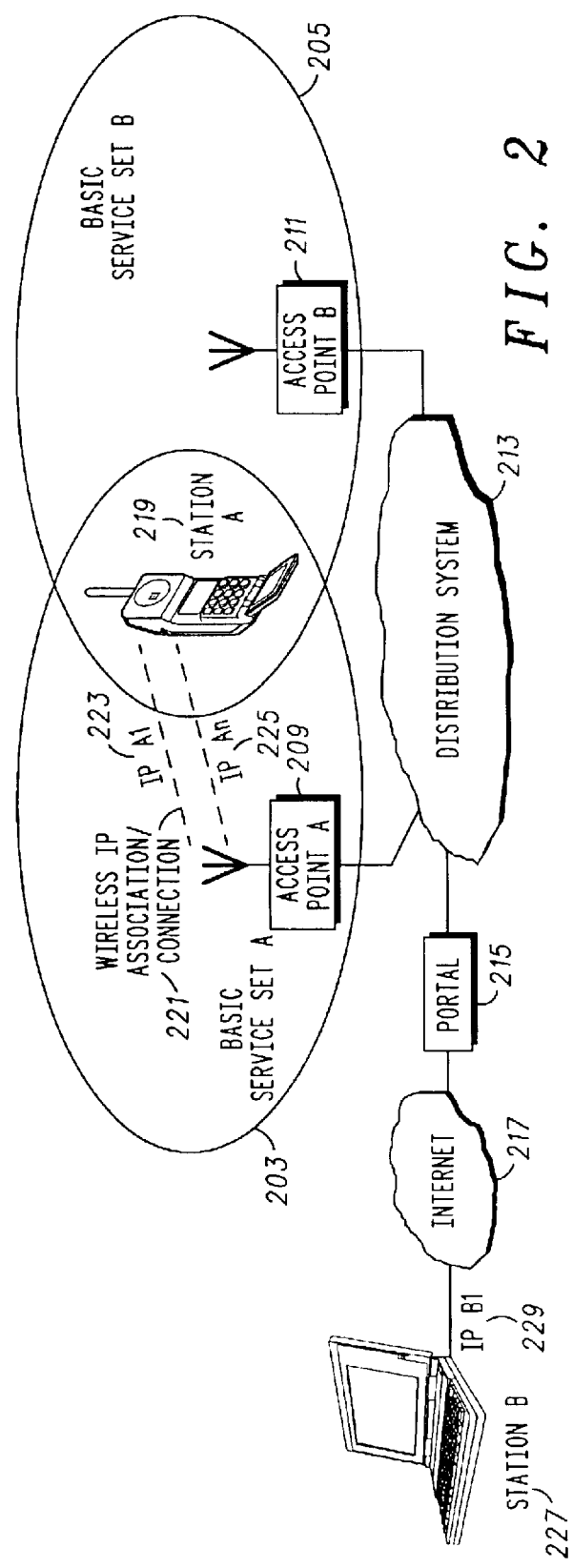
FIG. 2 through FIG. 4 are system level diagrams depicting a preferred embodiment of a handoff of a communications between two wireless IP connections using two wireless IP access points according to the present invention.
Figure 3:
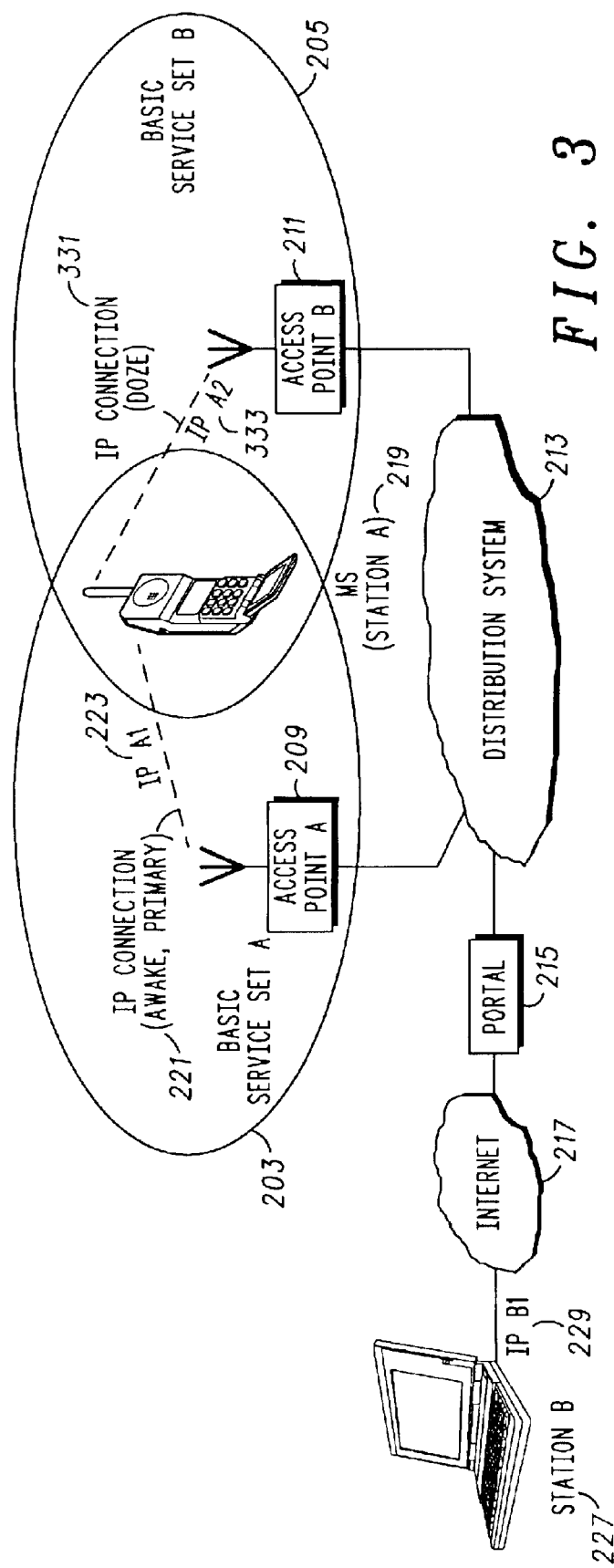
Figure 4:
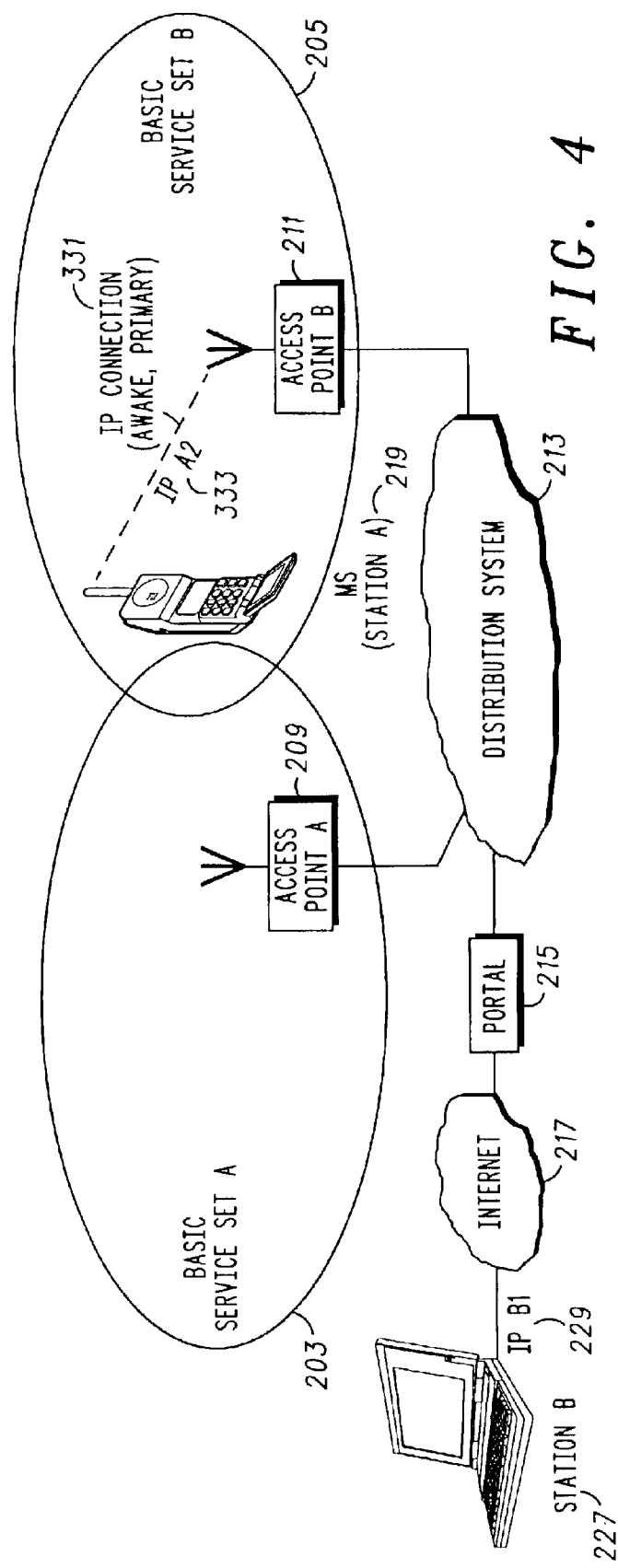

Referring to FIG. 2 through FIG. 4 system level diagrams depicting a handoff of a communications between two wireless IP connections using two wireless IP access points will be described and discussed. While it is expected that various access points according to various standards and technologies, such as HiperLAN, Bluetooth, other local area network technologies, and etc. could be used to effect a hand off within or between there respective systems or networks, the present disclosure will focus on the requisites for doing so and the preferred embodiment that uses an IEEE 802.11 network. Initially with reference to FIG. 2 some definitions and terminology that generally apply to 802.11 networks will be introduced.

Wireless IP using 802.11 is becoming increasingly popular. For example, many of the popular coffee shops now provide 802.11b connectivity to their customers. Customers can browse the internet or their company's intranet, read and reply to email while enjoying a latte. Wireless IP can also provide real time services such as Voice over IP and video conferencing. An 802.11 coverage area is called a Basic Service Set (BSS), such as BSS A 203 and BSS B 205. The 802.11 standard supports Isolated BSSs with an ad-hoc network of mobile stations, but a typical BSS contains an Access Point (AP), such as access point A 209 and access point B 211 that provides a bridge to or access to other wireless and wired LANs, such as the distribution system 213 and from there via the portal 215 to the Internet 217, for example.

Each BSS contains a single AP and some number of stations, such as station A 219. Within a BSS, an association such as wireless IP connection 221 can only be formed with one AP at any one time. This association rule makes it possible to route or distribute IP data to the station in a defined manner, as it is known what AP is associated with the station. Station A has a destination address or IP address of IP A1 223 for a first IP connection and messages with that address are routed via AP A 209 to the station. Note that IP station A is running an application on top of SCTP as the transport layer and sets up an additional IP connection or association with a second IP address, IP An 225, the station may appear as another station to the AP A 209. If station A 219 and station B 227 wish to communicate or exchange information an IP connection is established between them using the IP address IP B1 as a destination address for station B 227 and either IP A1 223 or IP An 225 depending on which is the primary destination address for station A as arbitrarily determined by station B or as directed by station A using SCTP messages. Note while the second IP address IP An may have or generate some academic interest it will not have much utility as far as increasing availability of station A.

A mobile station such as station A 219 can roam from one BSS into the next BSS and connect to another AP. The 802.11 standards also define an Extended Services Set (ESS) of coordinated BSSs to simplify roaming. This for example may allow a customer to roam from the coffee shop into a neighboring bookstore and continue to browse the Internet assuming both establishments are part of the same ESS. The customer's station first breaks the connection or drops the association with the AP in the coffee shop and then associates with the AP in the bookstore. This can all occur fast enough to accommodate browser operation with a few second interruption, however, it is not fast enough for real time or time critical applications, such as voice or voice over IP.

FIG. 2 in addition to serving as a backdrop for a description of how 802.11 networks operate is also a first stage for effecting a handoff from a first IP connection to a second IP connection for a time critical communication. Station A 219 operating within BSS A 203 first associates an IP connection 221 using IP address IP A1 223 with AP A 209. An application on station A that needs to communicate with an application on station B communicates over the SCTP transport layer and uses SCTP messages to inform station B that IP A1 is the primary destination address prior to starting any communications. Thus communicating between the wireless station, station A, and the second station, station B, using the first IP connection and the IP address IP A1 for the wireless station and IP B1 for the other station is undertaken.

Referring to FIG. 3 the next step in effecting a handoff will be discussed and described. FIG. 3 shows the relevant entities from FIG. 2 with like reference numerals and demonstrates setting up a second IP connection 331 with a second IP address 333 for the mobile or wireless station, station A 219, where the original or first IP connection 221 is the primary connection and is "awake" and ready to support or provide or continue to provide ongoing communications while the second IP connection is secondary or in a "doze" (low battery consumption) state. Thus both IP connections exist concurrently. Setting up the second IP connection further includes searching for an appropriate wireless IP connection, associating with a second wireless IP access point, such as AP B 211, and establishing connectivity with the second station B by informing the second station of the second IP address 333 using SCTP. Note that the searching, associating, and establishing are undertaken independent of the application supporting the communicating. Searching for the appropriate wireless IP connection may include one or more of determining that an available wireless IP connection includes a wireless IP access point and suitable services, that the wireless station A is able to successfully authenticate with the access point, and that connectivity to the second station is available. 17. The associating with the second wireless IP access point while described in detail herein as associating with an 802.11 access point, may be associating with a Bluetooth access point, a HiperLAN access point, or other a local area network (LAN) access point now known or as later defined.

In somewhat more detail, when the wireless station A learns (in known 802.11 specified ways) that it is within coverage of another BSS, such as BSS B 205 and expects that it may have to switch, it uses at least a second one of its IP connections 331 to associate with the AP B 211 of the other BSS. The station A continues to use the first IP connection 221 to communicate with the AP A 209 of the origination BSS A 203. The first IP address IP A1 223 also remains the primary address for SCTP. However, station A uses the SCTP messages to instruct the other station with SCTP capabilities to add the second IP address IP A2 333 as an alternative destination address.

This will require that the radio/mobility software interact with the SCTP layer. IP the second IP address IP A2 was previously known to the other SCTP endpoint, station B, station A must first instruct station B to delete the second IP address as a destination address. IP the second IP connection was previously associated with the origination AP, AP A 209, station A must first disassociate the second connection from the origination AP. For example IP IP A2 were IP An from FIG. 2 these issues would arise. A more complex and capable and thus likely more expensive station may maintain two independent wireless IP connections, one with each AP. However, the STA may also share wireless IP resources between the APs of the origination and target BSS. The 802.11 connection of the second IP connection with the target AP, AP b 211 would be in the 'power save' mode, and the first connection with the origination AP would be in either the 'active' or 'power save' mode, as appropriate for the application. IP the first connection is 'active', the second connection can steal time from it to occasionally wake up to listen for 802.11 beacons in the target BSS and to communicate with AP B 211. This will appear to the application as small RF imperfections that can be ironed out by the vocoders.

IP the first connection with the origination AP fails for some reason, the station A should bring its second IP connection to the 'active' mode as soon as possible. Without any prodding from the mobile station, the other station B will independently and automatically switch over to the second IP address. Even though this error case is not handled in real-time, it provides a more reliable connection than standard 802.11. For improved performance, the station A endpoint will use the first or the second IP address to instruct the other SCTP endpoint, station B, to add the second IP address. Preferably it used the second IP address because that will establish the proper settings in the APs, the Distribution System(s) and any new routers in the path between the stations.

Given that a first and second IP connection has been established the wireless station, station A, will determine at some point that the second IP connection 331 should be the primary connection. This determining that the second IP connection should be the primary connection may include or be motivated by one or more of determining that a signal from the first wireless IP access point, AP A 209 is weakening, that loading levels for the second IP connection are favorable over those of AP A, that services are desired that are available via the second IP connection or perhaps that favorable tariffs are available IP the second IP connection is used. When station A determines it is time to switch over to BSS B or AP B 211 it will use SCTP messages to inform the station B that the second IP address, IP A2 has becomes the primary SCTP destination address, bring the second connection with AP B 211 to the 'active' mode. Optionally or IP required, inform station B that it must delete the first IP address and disassociate the first IP connection 221 from AP A 209.

The result after the handoff has been implemented is demonstrated in FIG. 4. Station A may inform the station B of the new primary address, IP A2 via the first connection and then wait for confirmation on that connection. Preferably station A informs the other endpoint of the new primary address via the second connection, after bringing that connection to the 'active' mode. Preferably Station A times the switchover such that it starts during an idle period in the time critical or real-time voice communications. Station A may wait to disassociate with AP A until it is out of the coverage area of the AP A since having more than one connection increases reliability. Station A may associate the first IP connection with AP B, after it has disassociated from AP A, and inform the other endpoint that it has now become an alternative SCTP destination address. IP station A moves between BSSs of the same ESS, the STA can combine the steps of disassociation and association of the first IP connection into a single re-association. Note that the above techniques work even if the handoff is between ESSs. In contrast, as the standards for 802.11 make clear, without the use of the principles and concepts herein described an ESS transition will result in disruption of services.

Figure 5:
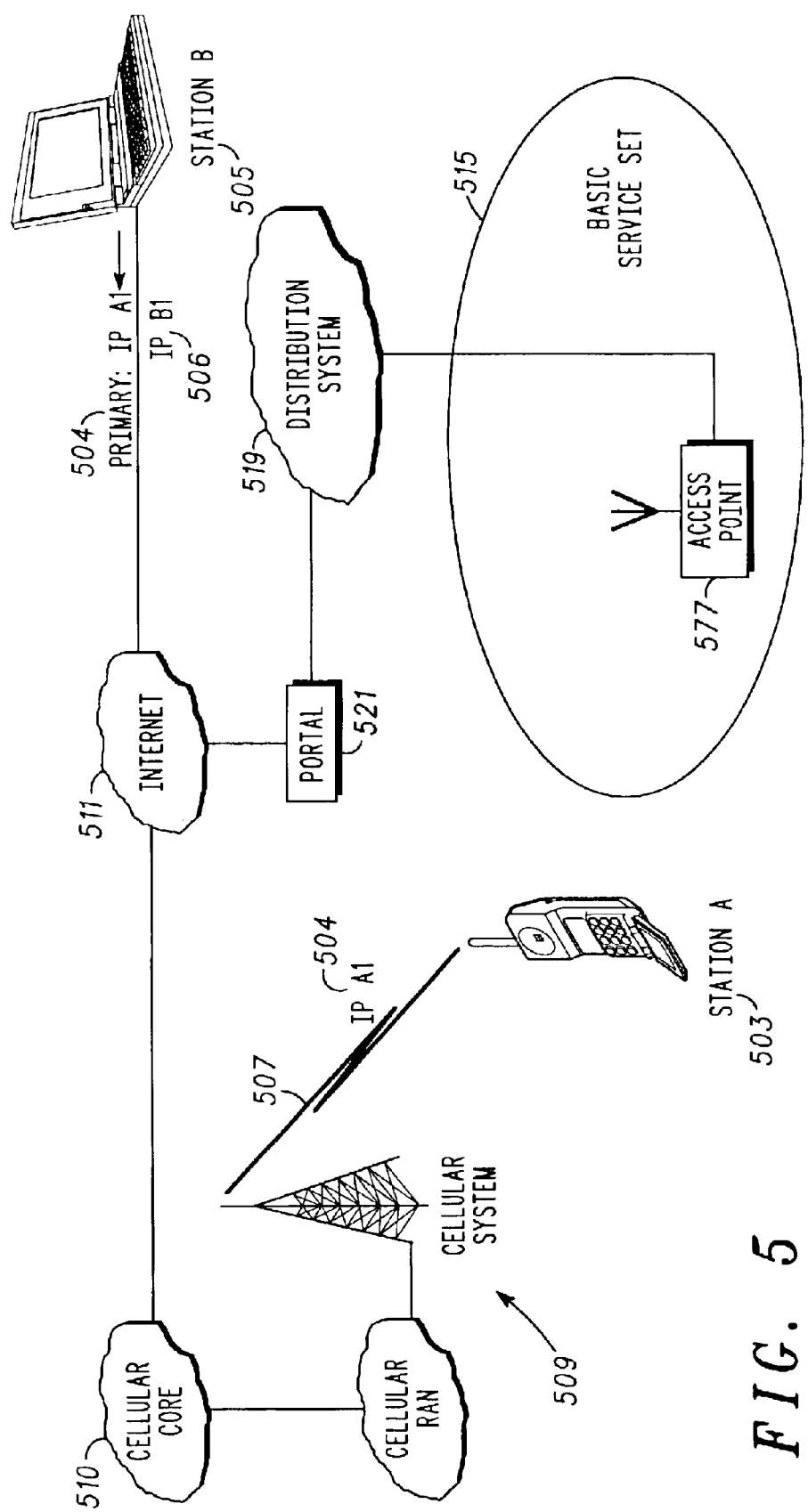
FIG. 5 through FIG. 7 are system level diagrams depicting another embodiment of a handoff of a communications between two IP connections using a cellular system and wireless IP access point in accordance with the present invention.
Figure 6:
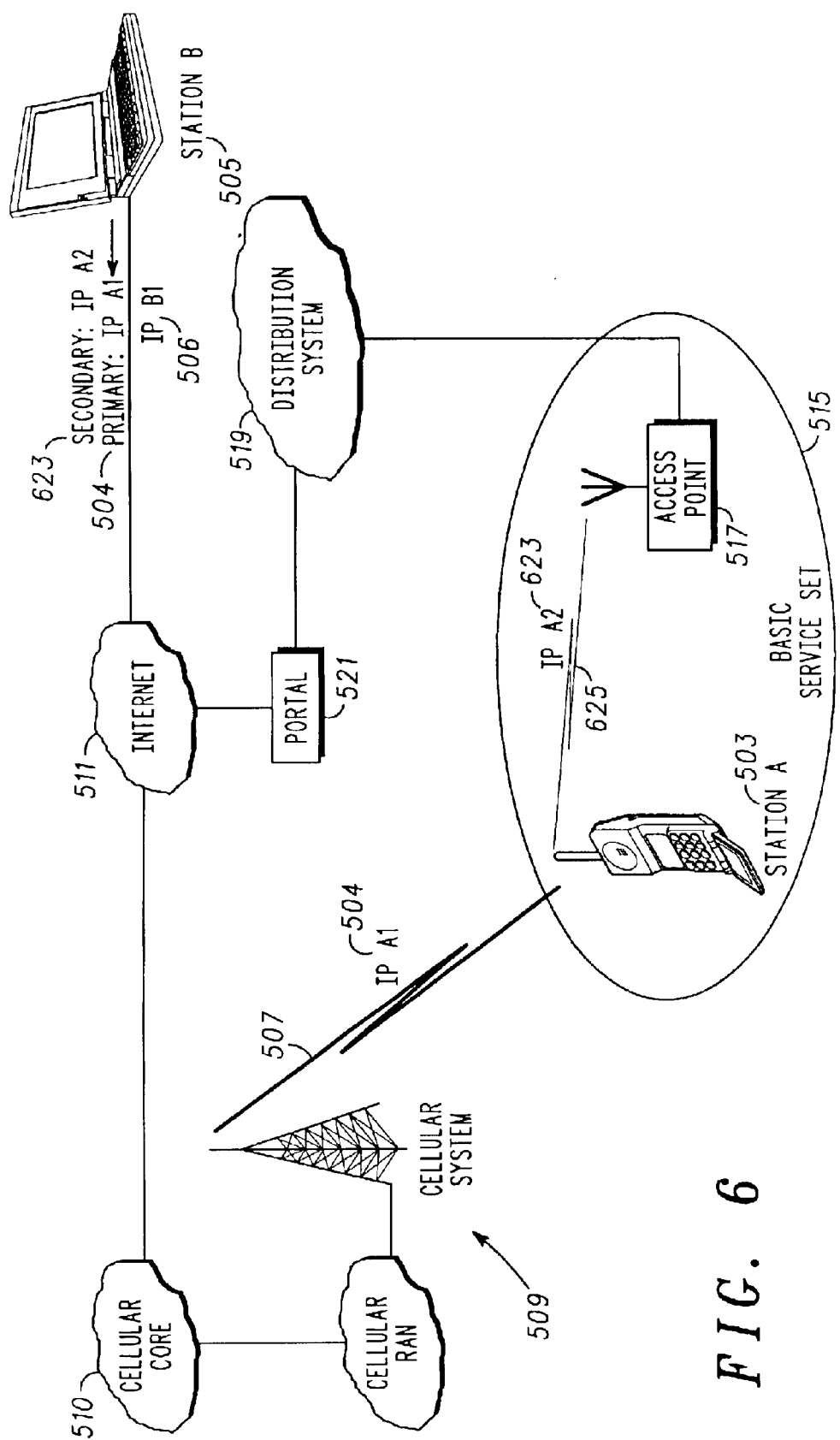
Figure 7:
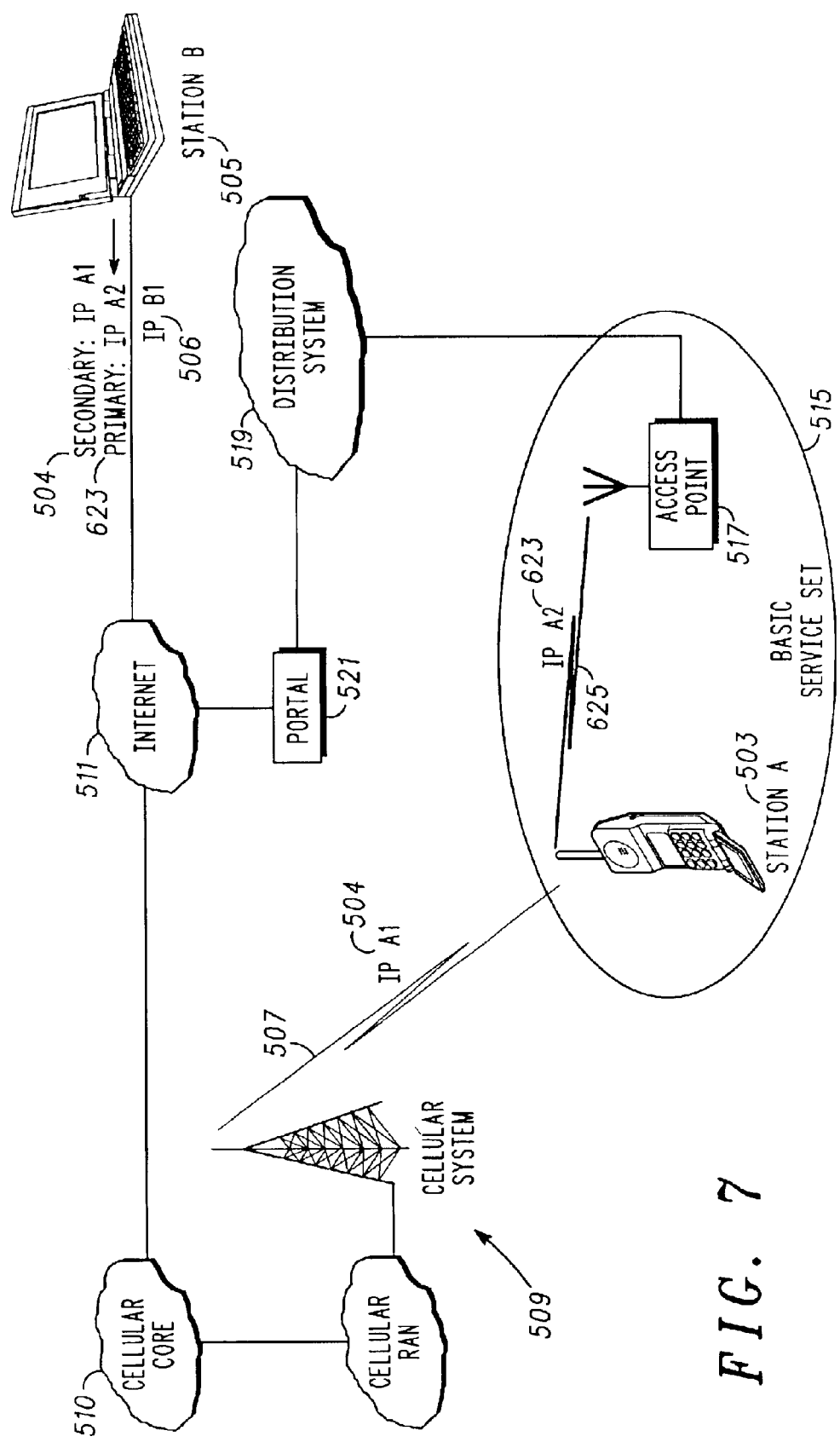

Referring to FIG. 5 through FIG. 7 system level diagrams depicting a hand off of a communications between two IP connections one using a cellular system and the other a wireless IP access point will be discussed and described. FIG. 5 shows a station A 503 such as a cellular handset or the like with an IP address, IP A1 504, communicating with a station B 505 having an IP address, IP B1 506, over an IP connection 507 that as here depicted is wireless. This IP connection 507 is via a cellular system including a cellular base station that is part of a radio access network 509 that is coupled via a cellular core 510 to a wired network, such as the Internet 511. Further depicted is an 802.11 network including an access point (AP) 517 with a coverage area or basic service set (BSS) 515 that is coupled via a distribution system 519 and portal 521 to the Internet 511.

As an overview, the handoff from or to a cellular system and a wireless IP network includes setting up a first IP connection including informing station B of the first IP address, IP A1, using SCTP. Then communicating, using an application that runs on SCTP between the wireless station, station A, and station B using the first IP connection 507 and first IP address for station A, setting up the second IP connection with a second IP address for station A, where the first IP connection is a primary connection and the second IP connection is a secondary connection, with both existing concurrently. Determining that the second IP connection should be the primary connection; and changing the second IP connection to the primary connection by informing the second station that the second IP address is the primary address using SCTP messages, wherein the time critical communication is immediately switched over to the second IP connection.

Referring to FIG. 5 the wireless station, station A is depicted before it moves into an 802.11 coverage area. The mobile uses IP over its cellular connection. It has at least one IP address (IP A1). An application on station A that supports both cellular and wireless IP will run on SCTP and may be conditioned to run on SCTP when or if it determines that the station supports both cellular and wireless IP. Station A informs the other endpoint, station B, of the IP address, IP A1 504 associated with the IP connection 507 or cellular connection. Station B will use the specified cellular IP addresses (A1) as the primary destination address. Station B is shown connected via the internet, but could also be connected to the cellular core or to the cellular Radio Access Network (RAN). Real-time applications preferably would use Session Initiation Protocol to setup the real time or time critical session over SCTP. The use of SIP over SCTP is not sufficient. For this handoff process to work, the bearer has to run over SCTP as well. SIP uses Session Description Language (SDL) to specify how the real-time data is to be sent between the endpoints. SIP relies on the Session Description Protocol (SDP) to provide media negotiation functionality. A novel extension can be claimed for SDP. Currently SDP can specify that voice or video data will use RTP over UDP. An improvement would allow a specification that the voice or video runs over SCTP instead, on a best effort stream. The mobile endpoint, station A may or may not use additional IP addresses over the cellular connection and provide them to station B as alternative SCTP destination addresses. However, the use of multiple connections via the same cellular connection does not increase availability all that much.

Referring to FIG. 6 the results of setting up the second IP connection 625 with a second IP address, IP A2 623 for the wireless station A, where the first IP connection remains the primary connection and the second IP connection is a secondary connection, with both existing concurrently are depicted. Setting up the second IP connection further includes searching for an appropriate connection, associating with a wireless IP access point, and establishing connectivity with the second station by informing the second station of the second IP address using SCTP. The searching, associating, and establishing are undertaken independent of and transparent to the application supporting communicating. The searching for the appropriate wireless IP connection further includes one or more of determining that an available connection includes an access point and suitable services, that the wireless station A is able to successfully authenticate with the access point, or that connectivity to station B is available. While our discussion here have described associating with a wireless IP access point that is an 802.11 access point it is expected that other local area access technologies will also benefit from the concepts and principles discussed here. Informing station B of the second IP address using SCTP, preferably, uses the second IP connection thereby initializing that connection.

In more detail an 802.11 capable mobile, such as station A 503 will regularly scan for an appropriate Wireless IP connection. When it finds an appropriate one it associates with the Access Point, authenticates, and establishes connectivity with the wired networks. Note that the BSS 515 may be associated with the cellular Service Provider (SP) and the wireless station A may even be able to use a SIM card for authentication. Alternatively the BSS may not be associated with the SP. There may or may not be a roaming agreement between the cellular SP and the operator of the BSS. Interestingly, the invention works without a roaming agreement. The mobile may be able to authenticate independently with the BSS and gain access to the wired networks. This may be done without any knowledge to the cellular SP. In any event in the process, the wireless station may acquire a new IP address (via DHCP, for example). The mobile may also be able to use an existing IP address. In any case, the mobile has at least one second IP address, IP A2 623 that is used over the 802.11 IP connection 625. The mobile or station A then uses SCTP extension messages to instruct the other SCTP endpoint, station B 505, to add the second IP address as an alternative destination address for station A. During this process, the application on the mobile continues to use the first IP address over the cellular based IP connection to communicate with station B. While all this is done, the application on station B continues to use the first IP address as the primary address for SCTP, and application data continues to flow through the cellular system.

Note that the acquisition of the second IP address is not done by the application. It is done by the radio/mobility software within station A. This radio/mobility software also interacts with the SCTP layer to inform station B of the second IP address, IP A2 623. IP the second IP address was previously associated with the cellular connection, the mobile must first disassociate the second IP address from the cellular connection. In that case, it must first inform station B to delete the second address. IP the cellular connection now fails for some reason, the other endpoint will automatically switch over to the 802.11 connection. The mobile preferably should keep its 802.11 connection in the 'active' mode. Even though this error case is not handled in real-time, it already provides a more reliable connection than prior art approaches. Station A can use the first or the second IP address to instruct station B to add the second IP address. Preferably, it uses the second address because that will establish the proper settings in the AP 517, the Distribution System 519 and any new routers in the path between the endpoints or stations.

FIG. 7 shows the results of the next processes in the handoff from the cellular to the wireless IP system. Once the second IP connection is set up at some point the wireless station A determines that the second IP connection should be the primary connection. Determining that the second IP connection should be the primary connection may include one or more of determining that a signal from the cellular base station is weakening, that tariffs for the second IP connection are favorable, or that services, such as higher bandwidth are needed or desired that are available via the second IP connection. In any event station A is now ready to switch over to the wireless IP access point 511 and use 802.11. Station A will bring the second connection with the 802.11 AP 517 to the 'active' mode, IP it was not already 'active' and using SCTP extension messages inform station B that the second IP address is now the primary SCTP destination address. The application on station B will now start using the second IP address 623 as the destination address for station A. Note that in this case given the principles and concepts hereof the switch is more or less immediate and completely transparent to the application.

Likely the 802.11 AP is indoors and cellular coverage may be marginal. When station A observes that the cellular connection is deteriorating it may inform station B that it must delete the first IP address and drop the cellular IP connection. Note that the application will continue to operate normally. Station A may inform station B of the new primary address via the first connection and then wait for confirmation on that connection. Preferably, station A informs station B of the new primary address via the second IP connection, after bringing that connection to the 'active' mode. Preferably, station A times the switchover such that it starts during a an idle or silent period in the time critical communication such as a pause or a silence in a real-time voice conversation. Station A may choose to wait to drop the first IP connection 504 until it is out of the coverage area of the cellular system; since having more than one connection increases reliability. Station A may also associate the first IP connection with the 802.11 AP 517, after it has disassociated it from the cellular system, and inform station B that it has now become an alternative SCTP destination address.

Roaming back to cellular is essentially the reverse of the previously discussed process. The application is running over SCTP using an 802.11 connection on a first IP address. Station B is using the first IP address as the primary destination address. IP needed, station A establishes a connection with the cellular system that supports data transfer on a second IP address. The second IP address can be static or can be obtained dynamically. Special provisions may be needed to obtain the appropriate Quality Of Service, like the establishment of a secondary PDP context in UMTS systems. The software in the mobile then uses the SCTP extension messages to inform the SCTP layer in station B about the availability of the second IP address. The software in station A then uses the SCTP messages to instruct the SCTP layer in the other endpoint to use the second IP address as the primary destination address. The mobile may now tear down the 802.11 IP connection. Before doing so, it should use the SCTP messages to instruct the SCTP layer in station B to delete the first IP address.

Figure 8:
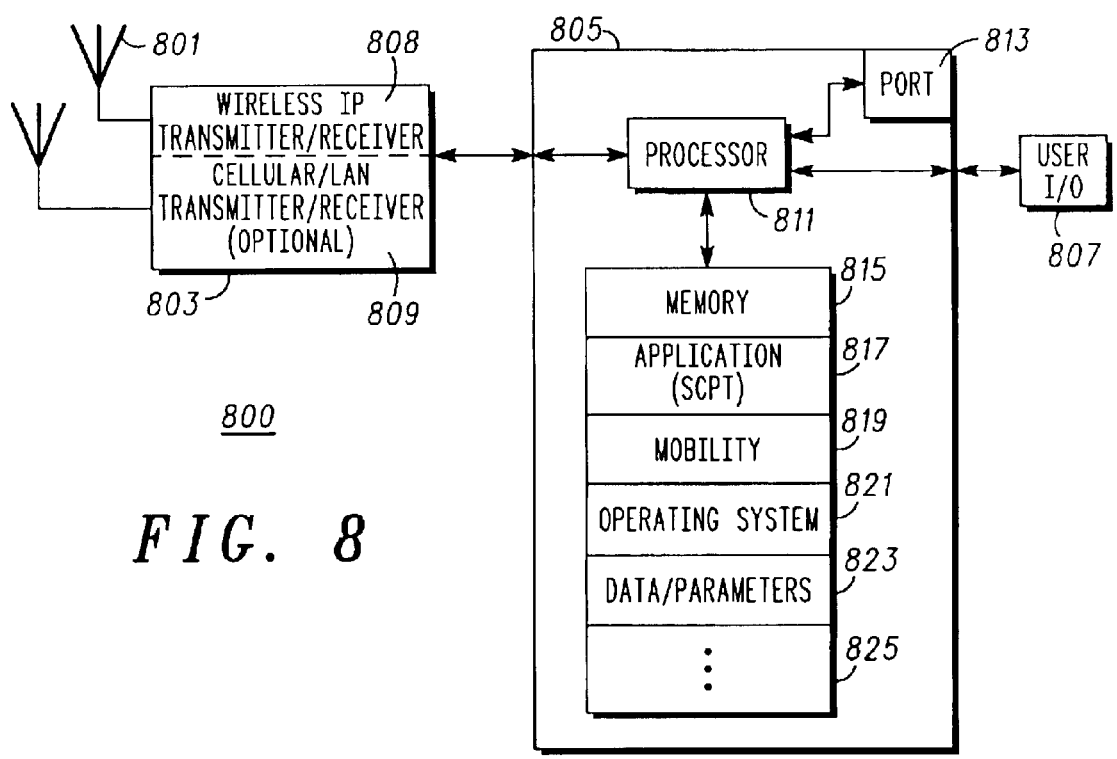
FIG. 8 depicts functional block diagram of a preferred embodiment of a wireless communications unit suitable for use in the systems of FIG. 2 through FIG. 7 according to the present invention.

Referring to FIG. 8 a functional block diagram of a preferred embodiment of a wireless communications unit 800 suitable for use in the systems of FIG. 2 through FIG. 7 as the wireless station or station A will be discussed and described. The wireless communications unit 800 is arranged and constructed to effect a handoff from a first Internet Protocol (IP) connection to a second IP connection for a time critical communication. The wireless communications unit includes, coupled to a known antenna 801, a conventional wireless transceiver 803 and a controller 805 cooperatively arranged for communicating with a second station using the first IP connection and a first IP address for the wireless communications unit. The controller is further coupled to a conventional user input output 807, including for example a display, keyboard, or audio transducers, and is operable for: setting up the second IP connection with a second IP address for the wireless communications unit where the first IP connection is a primary connection and the second IP connection is a secondary connection, with both existing concurrently; determining that the second IP connection should be the primary connection; and changing the second IP connection to the primary connection by informing the second station that the second IP address is the primary address using stream control transmission protocol (SCTP) messages, wherein the time critical communication is immediately switched over to the second IP connection.

To do so the wireless transceiver 803 will require a wireless IP transceiver 808 and may require an additional cellular or local area network transceiver 809. The controller 805 includes a processor 811, preferably a microprocessor or digital signal processor both known and widely available, coupled to an optional port 813 that provides an interface to one or more devices such as a portable computer, personal digital assistant, network interface card, modem, or the like one or more of which may be fully integrated with the wireless communications unit. The processor is inter coupled to a memory 815 that includes, as appropriate for the particular unit, some combination of RAM, ROM, PROM, EEPROM or other electronic or magnetic storage media that is used to store software routines or instructions as well as data and parameters for such routines and instructions and the unit that when executed by the processor result in the wireless communications unit operating as required to support various known functions as well as handoff processes as disclosed herein. These software instructions or routines include one or more applications 817, for example voice over IP telephony, an email client or browser that support communication with other stations or hosts and run on top of an SCTP transport layer, and mobility management routines 819 that handles various duties associated with roaming or moving from one access point to another, including handoff procedures. Further included is the basic and known operating system 821, data and parameters information 823, and many other routines 825 that one of ordinary skill would recognize and be familiar with.

Note that for the wireless communications unit in order to effect a handoff from or to an IP connection via a cellular base station to or from an IP connection via a local area wireless IP network, such as an 802.11 network will require that the wireless transceiver 803 include a cellular transceiver and capabilities to operate on cellular systems. IP the handoff is from one wireless IP network to another such network the wireless transceiver may only require the wireless IP transceiver 808 in many instances as certain of these networks, such as Bluetooth, are set up and organized so that one transceiver is able to maintain multiple IP connections. In other examples a second technology dependent transceiver will be required, for example when operating between and 802.11 wireless IP network and a Bluetooth based network As above discussed the wireless communications unit will operate in accordance with SCTP conventions and independent of applications to communicate its own destination IP addresses and establish the proper priorities of such IP addresses and thus IP connections with other endpoints or stations and thereby effect a handoff of communications in a virtual real time manner between IP connections as judged appropriate based on similar motivations and circumstances as earlier discussed.

Figure 9:
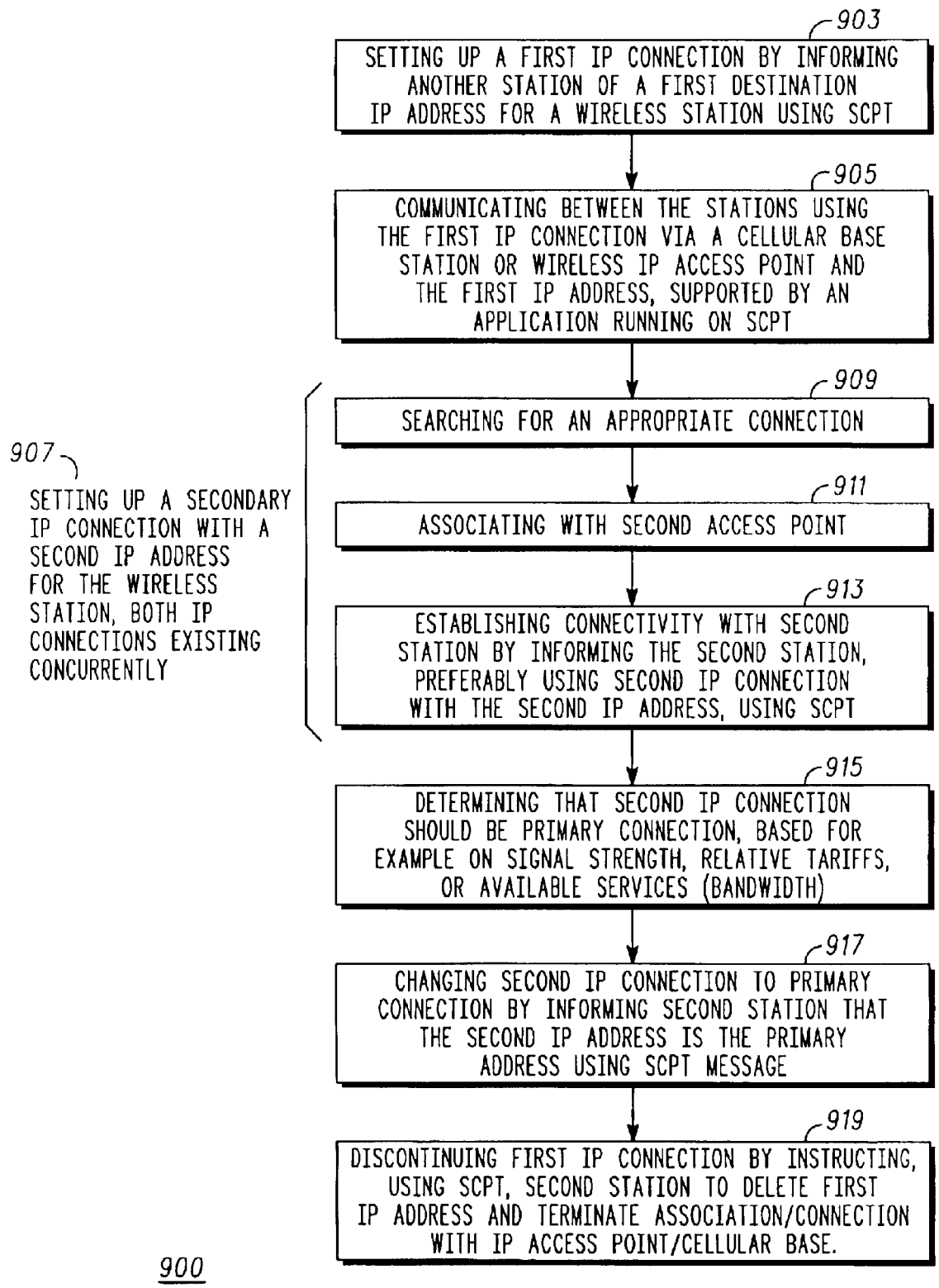
FIG. 9 shows a flow chart of a preferred method of effecting a handoff of a time critical communications between two IP connections according to the present invention.

In conclusion with reference to FIG. 9 a flow chart of a preferred method of effecting a handoff of a time critical communications between two IP connections will be discussed and described. This discussion will be in the nature of a summary and thus at an overview level. This method may be practiced advantageously, for example, by the wireless communications unit of FIG. 8 operating in a suitable system such as those shown in FIG. 2 through FIG. 7. FIG. 9 depicts a method of effecting a handoff from a first Internet Protocol (IP) connection to a second IP connection for a time critical communication and begins at 903 with setting up a first IP connection by informing a second station of a first destination IP address for a wireless station using SCTP messages. By SCTP conventions this will be the primary IP address and thus IP connection between the two stations. Then at 905 the method depicts communicating between the wireless station and the second station via a cellular base station or wireless IP access point such as an 802.11 access point using the first IP connection and first IP address for the wireless station; supported by an application running on an SCTP transport layer.

At 907 the method shows setting up the second IP connection with a second IP address for the first wireless station where the first IP connection is a primary connection and the second IP connection is a secondary connection with both existing concurrently. In more detail setting up the second connection includes searching for an appropriate connection 909, associating with a second access point 911, such as a wireless IP access point, and establishing connectivity with the second station by informing, preferably using the second IP connection, the second station of the second IP address using SCTP messages. Note that 909, 911, and 913 are preferably undertaken independently of and transparently to the application supporting the communicating. Searching 909 for the appropriate wireless IP connection may include one or more of determining that an available connection includes an access point and suitable services, that the first wireless station is able to successfully authenticate with and access the access point, and that connectivity to the second station is available. Associating with a wireless IP access point can include associating with one of an 802.11 access point, a Bluetooth access point, a HiperLAN access point, and a local area network (LAN) access point according to the provisions for each such access point.

Then 915 shows determining that the second IP connection should be the primary connection, based for example on one or more of determining that a signal from the cellular base station or wireless IP access point is weakening, that tariffs for the second IP connection are favorable, or that services, such as bandwidth or security, etc. are desired and available via the second IP connection. Next 917 shows changing the second IP connection to the primary connection by informing the second station that the second IP address is the primary address using SCTP messages. Doing this results in immediately switching the time critical communication over to the second IP connection. Then 919 indicates, when the second IP connection becomes the primary connection, discontinuing the first IP connection by for example instructing the second station to delete the first IP address using SCTP messages and terminating any session via the cellular base station or with the first wireless IP access point.

The apparatus and methods discussed and described above, and the inventive principles and concepts thereof are intended to and will alleviate problems caused by the lack of mobility considerations with prior art wireless IP systems. Using these principles of establishing a secondary IP connection using SCTP commands and messages that exists concurrently with a first IP connection between stations using SCTP transport layers will allow a communications device to effect a handoff of time critical communications at the will of the communications device and thus facilitate connectivity for mobile individuals. For example these principles and concepts can be used to effect a handoff between disparate cellular packet data systems that do not otherwise support a fast handoff, such as UMTS and CDMA systems as well be apparent to one of ordinary skill given the teachings herein.

This disclosure is intended to explain how to fashion and use various embodiments in accordance with the invention rather than to limit the true, intended, and fair scope and spirit thereof. The foregoing description is not intended to be exhaustive or to limit the invention to the precise forms disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of effecting a handoff from a first Internet Protocol (IP) connection to a second IP connection for a time critical communication, the method comprising:

communicating between a first wireless station and a second station using the first IP connection and a first IP address for the first wireless station;

setting up the second IP connection between the first wireless station and the second station with a second IP address for the first wireless station, the first IP connection being a primary connection and the second IP connection being a secondary connection, both existing concurrently;

determining that the second IP connection should be the primary connection; and changing the second IP connection to the primary connection by informing the second station that the second IP address is the primary address using stream control transmission protocol (SCTP) messages, the SCTP messages originating from the first wireless station, wherein the time critical communication is immediately switched over to the second IP connection.

2. The method of claim 1 wherein said communicating between said first wireless station and said second station using the just IP connection further uses a cellular base station, said communicating supported by an application on the first wireless station that runs on SCTP.

3. The method of claim 2 further including informing said second station of the first IP address using SCTP before starting said communicating.

4. The method of claim 2 wherein said setting up the second IP connection further includes searching for an appropriate connection, associating with a wireless IP access point, and establishing connectivity with the second station by informing said second station of the second IP address using SCTP.

5. The method of claim 4 wherein said searching, said associating, and said establishing are undertaken independent of said application supporting said communicating.

6. The method of claim 4 wherein said searching for said appropriate wireless IP connection further includes one of determining that an available connection includes an access point and suitable services, that said first wireless station is able to successfully authenticate with said access point, and that connectivity to said second station is available.

7. The method of claim 4 wherein said associating with a wireless IP access point further includes associating with one of an 802.11 access point, a Bluetooth access point, a HiperLAN access point, and a local area network (LAN) access point.

8. The method of claim 4 wherein said informing said second station of the second IP address wing SCTP uses said second connection thereby initializing said second connection.

9. The method of claim 2 wherein said determining that the second IP connection should be the primary connection further includes one of determining that a signal from said cellular base station is weakening, that tariffs for the second IP connection are favorable, and that services are desired that are available via the second IP connection.

10. The method of claim 2 further including, when the second IP connection becomes the primary connection, discontinuing the first IP connection.

11. The method of claim 10 wherein said discontinuing the first IP connection further includes instructing the second station to delete the first IP address using SCTP messages and terminating any session via said cellular base station.

12. The method of claim 1 wherein said communicating between said first wireless station and said second station using the first IP connection further uses a first wireless IP access point, said communicating supported by an application on the first wireless station that runs on SCTP.

13. The method of claim 12 further including informing said second station of the first IP address using SCTP before starting said communicating.

14. The method of claim 12 wherein said setting up the second IP connection further includes searching for an appropriate wireless IP connection, associating with a second wireless IP access paint, and establishing connectivity with the second station by informing said second station of the second IP address using SCTP.

15. The method IP claim 14 wherein said searching, said associating and said establishing arc undertaken independent of said application supporting said communicating.

16. The method of claim 14 wherein said searching for said appropriate wireless IP connection further includes one of determining that an available wireless IP connection includes a wireless IP access point and suitable services, that said first wireless station is able to successfully authenticate with said access point, and that connectivity to said second station is available.

17. The method of claim 14 wherein said associating with said second wireless IP access point further includes associating with one of an 802.11 access point, a Bluetooth access point, a HiperLAN access point, and a local area network (LAN) access point.

18. The method of claim 14 wherein said informing said second station of the second IP address using SCTP uses said second connection thereby initializing said second connection.

19. The method of claim 12 wherein said determining that the second IP connection should be the primary connection further includes one of determining that a signal from said first wireless IP access point is weakening, that loading levels for the second IP connection are favorable, and that services are desired that are available via the second IP connection.

20. The method of claim 12 further including, when the second IP connection becomes the primary connection, discontinuing the first IP connection by instructing the second station to delete the first IP address using SCTP messages and disassociating with said first wireless access point.

21. The method of claim 12 wherein said setting up the second IP connection further includes searching for an appropriate cellular connection, establishing a connection with a second cellular base station, and establishing connectivity with the second station by informing said second station of the second IP address using SCTP.

22. The method of claim 12 wherein said setting up the second IP connection further includes searching for an appropriate cellular connection, establishing a connection with a second cellular base station, and establishing connectivity with the second station by informing said second station of the second IP address using SCTP.

23. A wireless communications unit arranged and constructed to effect a handoff from a first Internet Protocol (IP) connection to a second IP connection for a time critical communication, the wireless communications unit comprising:

a wireless transceiver and a controller cooperatively arranged for communicating with second station using the first IP connection and a first IP address for the wireless communications unit;

said controller further for:

setting up the second IP connection with a second IP address for the wireless communications unit, the first IP connection being a primary connection and the second IP connection being a secondary connection, both existing concurrently;

determining that the second IP connection should be the primary connection; and changing the second IP connection to the primary connection by informing the second station that the second IP address is the primary address using stream control transmission protocol (SCTP) messages, wherein the time critical communication is immediately switched over to the second IP connection.

24. The wireless communications unit of claim 23 wherein said wireless transceiver includes a cellular transceiver for communicating with said second station using the first IP connection through a cellular base station, said communicating supported by an application executed by said controller, said application running on SCTP.

25. The wireless communications unit of claim 24 further including informing said second station of the first IP address using SCTP before starting said communicating.

26. The wireless communications unit of claim 24 wherein said transceiver further includes a wireless IP transceiver cooperatively operating with said controller for setting up the second IP connection and further for searching for an appropriate wireless IP connection, associating with a wireless IP access point, and establishing connectivity with the second station by informing said second station of the second IP address using SCTP.

27. The wireless communications unit of claim 26 wherein said searching, said associating, and said establishing are undertaken independent of said application supporting said communicating.

28. The wireless communications unit of claim 26 wherein said searching for said appropriate wireless IP connection further includes one of determining that an available connection includes an access point and suitable services, that said first wireless station is able to successfully authenticate with said access point, and that connectivity to said second station is available.

29. The wireless communications unit of claim 26 wherein said associating with a wireless IP access point further includes associating with one of an 802.11 access point, a Bluetooth access point, a HiperLAN access point, and a local area network (LAN) access point and said transceiver further includes a second transceiver, respectively compatible with one of 802.11, Bluetooth, HiperLAN, and local area network systems.

30. The wireless communications unit of claim 26 wherein said informing said second station of the second IP address using SCTP uses said second transceiver and said second connection thereby initializing said second connection.

31. The wireless communications unit of claim 24 wherein said determining that the second IP connection should be the primary connection further includes one of determining that a signal from said cellular base station is weakening, that tariffs for the second IP connection are favorable, and that services are desired that are available via the second IP connection.

32. The wireless communications unit of claim 24 further including, when the second IP connection becomes the primary connection, discontinuing the first IP connection by instructing, using SCTP messages, the second station to delete the first IP address and terminating any session via said cellular base station.

33. The wireless communications unit of claim 23 wherein said wireless transceiver includes a wireless IP transceiver for communicating with said second station using the first IP connection through a wireless IP access point, said communicating supported by an application executed by said controller, said application running on SCTP.

34. The wireless communications unit of claim 33 further including informing said second station of the first IP address using SCTP before starting said communicating.

35. The wireless communications unit of claim 33 wherein said wireless IP transceiver cooperatively operates with said controller for setting up the second IP connection and further for searching for an appropriate wireless IP connection, associating with a second wireless IP access point, and establishing connectivity with the second station by informing said second station of the second IP address using SCTP.

36. The wireless communications unit of claim 35 wherein said searching, said associating, and said establishing are undertaken independent of said application supporting said communicating.

37. The wireless communications unit of claim 35 wherein said searching for said appropriate wireless IP connection further includes one of determining that an available wireless IP connection includes a wireless IP access point and suitable services, that said first wireless station is able to successfully authenticate with said access point, and that connectivity to said second station is available.

38. The wireless communications unit of claim 35 wherein said associating with said second wireless IP access point further includes associating with one of an 802.11 access point, a Bluetooth access point, a HiperLAN access point, and a local area network (LAN) access point and said transceiver further includes a second transceiver respectively compatible with one of 802.11, Bluetooth, HiperLAN, and local area network systems.

39. The wireless communications unit of claim 35 wherein said informing said second station of the second IP address using SCTP uses said second transceiver and said second connection thereby initializing said second connection.

40. The wireless communications unit of claim 33 wherein said determining that the second IP connection should be the primary connection further includes one of determining that a signal from said first wireless IP access point is weakening, that loading levels for the second IP connection are favorable, and that services are desired that are available via the second IP connection.

41. The wireless communications unit of claim 33 further including, when the second IP connection becomes the primary connection, discontinuing the first IP connection by instructing the second station to delete the first IP address and disassociating with said first wireless access point.

42. A method of effecting a handoff from a first internet Protocol (IP) connection to a second IP connection for a time critical communication, the method comprising:

communicating between a first wireless station and a second station using the first IP connection and a first IP address for the first wireless station via a first wireless access point, the first IP connection being a primary Stream Control Transmission Protocol (SCTP) connection;

establishing between the first wireless station and the second station the second IP connection using a second IP address for the first wireless station via the first wireless access point, the second IP connection being a secondary SCTP connection, the first and second IP connection existing concurrently;

associating with a second wireless access point;

setting up the second IP connection with the second IP address for the first wireless station via the second wireless access point, the first and second IP connection existing concurrently;

determining that the second IP connection should be the primary connection; and changing the second IP connection to the primary connection by informing the second station that the second IP address is the primary address using stream control transmission protocol (SCTP) messages, the SCTP messages originating from the first wireless station, wherein the time critical communication is switched over to the second IP connection.

* * * * *